United States Patent [19]
Kupper et al.

[11] Patent Number: 5,129,820
[45] Date of Patent: Jul. 14, 1992

[54] METHOD AND APPARATUS FOR COOLING FIRED BULK MATERIAL

[75] Inventors: Detlev Kupper, Telgte; Klaus Adler, Oelde, both of Fed. Rep. of Germany

[73] Assignee: Krupp Polysius AG, Fed. Rep. of Germany

[21] Appl. No.: 636,281

[22] Filed: Dec. 31, 1990

[30] Foreign Application Priority Data

Feb. 7, 1990 [DE] Fed. Rep. of Germany ....... 4003679

[51] Int. Cl.$^5$ .............................................. F27D 15/02
[52] U.S. Cl. ........................................ 432/77; 432/78
[58] Field of Search ...................................... 432/77-80

[56] References Cited

U.S. PATENT DOCUMENTS

| | | | |
|---|---|---|---|
| 3,089,688 | 5/1963 | Ostberg | 432/77 |
| 3,831,291 | 8/1974 | Kayatz | 432/77 |
| 4,337,083 | 6/1982 | Sweat | 432/77 |
| 4,457,081 | 7/1984 | Von Wedel | 432/77 |
| 4,624,636 | 11/1986 | Willis | 432/78 |
| 4,654,004 | 3/1987 | Miyoshi et al. | 432/80 |
| 4,732,561 | 3/1988 | Eiring et al. | 432/78 |
| 4,762,489 | 8/1988 | Schmits | 432/77 |

Primary Examiner—Henry C. Yuen
Attorney, Agent, or Firm—Learman & McCulloch

[57] ABSTRACT

The invention relates to a method and apparatus for cooling fired bulk material in which the height of the material bed on a grate conveyor in a first cooling zone is set by the conveying speed of the grate and by gravity. Thus in a particularly simple way the height of the material bed on the conveyor is adjusted in the transport direction in the first cooling zone which serves for heat recovery.

12 Claims, 6 Drawing Sheets

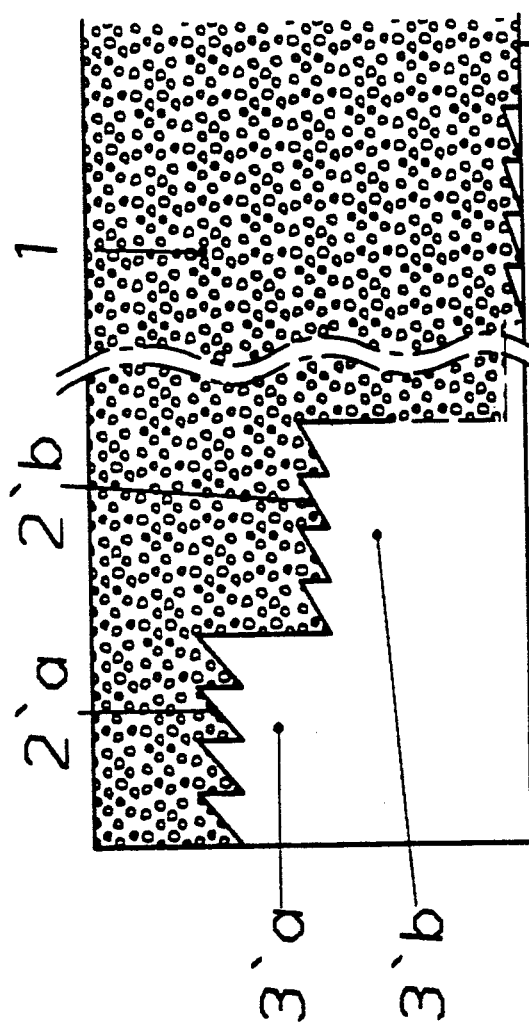
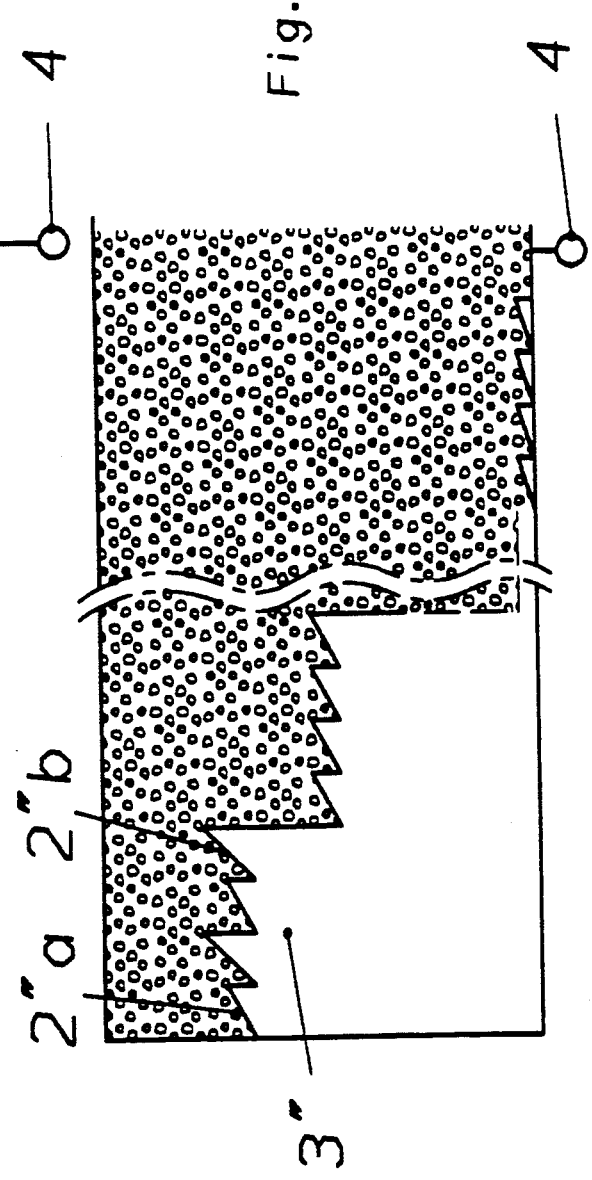

METHOD AND APPARATUS FOR COOLING FIRED BULK MATERIAL

TECHNICAL FIELD

The invention relates to a method and to apparatus for cooling fired bulk material such as cement clinker on grate coolers with air.

BACKGROUND OF THE INVENTION

For cooling fired bulk material, for example cement clinker, reciprocating or travelling grate conveyor coolers are used in which the bed of the built material conveyed on the grate surface has a substantially constant bed height in the first cooling zone which serves for heat recovery.

The pressure loss of the cooling air stream passing through the material bed is made up of the resistance of the grate and the resistance of the granular mass of material. The pressure below the grate surface is essentially the pressure due to resistance to air flow. In the grate plates and in the granular mass of material. Thus the pressure measured below the grate surface characterises the pressure loss in the material mass. If the pressures in all the chambers in the longitudinal direction of the cooler are measured, this is designated as the pressure profile.

In the known method referred to above, in which the granular mass of material has a substantially constant bed height in the first cooling zone which serves for heat recovery, the pressure profile falls off in the transport direction. As more detailed investigations have shown, a pressure profile which falls off the material bed rises in the transport direction at least in the first cooling zone which serves for heat recover. At the beginning of the first cooling zone the layer height is low as is required for effective quenching of the hot bulk material to avoid caking together. As fired bulk material progresses through the first cooling zone serving for heat recovery, the bed height rises. The relatively long heat exchange time between gas and fired bulk material provides good heat recovery.

The fired bulk material cooling apparatus disclosed in the von Wedel patent increases the bed height in the transport direction. The increase in bed height is achieved by means of a baffle plate which projects down from above and into the material bed at the end of the first cooling zone and holds back the material in the first cooling zone. However, at the end of the first cooling zone the fired material is still at a relatively high temperature and possesses a high hardness and is abrasive. The baffle plate projecting into the granular mass of material is exposed to extraordinarily severe wear and consequently must be replaced after a comparatively short operating time necessitates very undesirable shutdown periods.

SUMMARY OF THE INVENTION

An object of the invention is to increase the height of the fired material bed in the transport direction in the first cooling zone, which serves for heat recovery, in a simple manner.

A further object of the invention is to control the height of a fired material bed in the transport direction in the first cooling zone by controlling conveying of fired material by the grate conveyor.

The layer height of the material bed in the first cooling zone is set exclusively by the conveying characteristic of the stepped grate surface and by gravity. The "conveying characteristics" of the stepped grate surface are a function of the grate plate geometry, the shear coefficient of the grate steps, the reciprocating grate drive and the grate slope.

The stepped rise in the layer height in the first cooling zone which serves for heat recovery is a characteristic of the invention. On the first step a normal bed height is set, and at this height the fired bulk material moves rapidly and thus caking together is prevented.

On the following steps the layer height rises, and advantageously a pressure profile is set which is constant or rises in the transport direction and facilitates a particularly good degree of recuperation.

It is essentially to the solution according to the invention that the layer height which increases in the transport direction is achieved without the use of a baffle element projecting into the granular mass of material. The conveying characteristic of the stepped grate surface and gravity determining the increase in layer height. This results in a free-flowing material bed with a surface which is not influenced by baffle elements. Thus the disruptive wear on baffle elements is avoided, as are the disruptions to operation which such wear causes.

DESCRIPTION OF THE DRAWINGS

FIGS. 1 to 4 are schematic representations of embodiments of the invention,

DETAILED DESCRIPTION OF THE INVENTION

Figure 1:
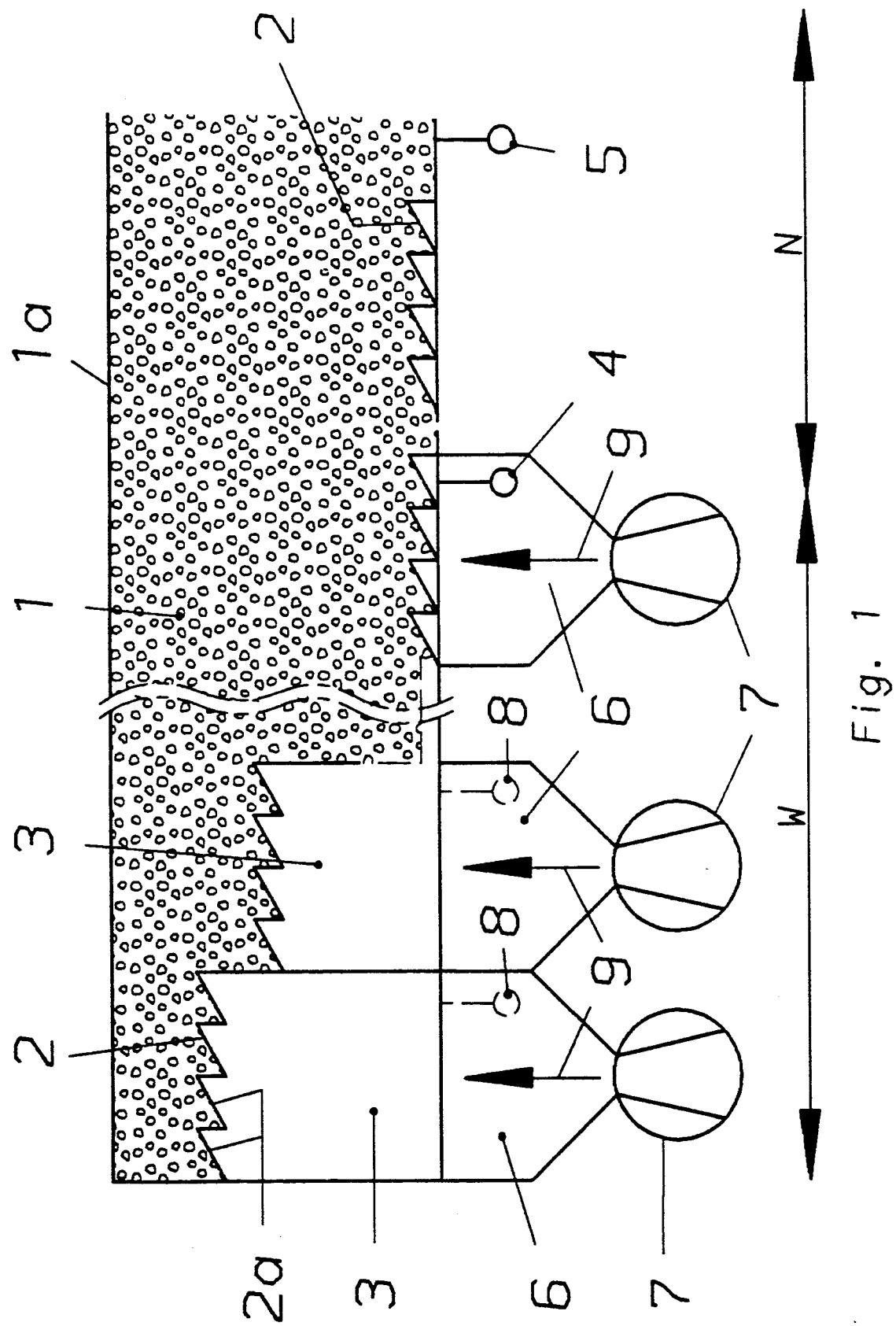

The apparatus for cooling fired material which is shown schematically in FIG. 1 contains a first cooling zone W which serves for heat recovery and a second cooling zone N which serves for after-cooling. A grate surface 2 which conveys the bulk material 1 through the first and second cooling zones in succession is of stepped construction at least in the first cooling zone W in this embodiment. The conveying speed of the individual steps 3 of the grate surface 2 is set for the first cooling zone W by means of a common drive 4. The grate surface 2 is operated in the second cooling zone N by a separate drive 5.

An aerating chamber 6 which is supplied with air by a blower 7 is associated with each step 3 below the grate surface 2 of the first cooling zone W. Aerating chambers 6 can also be provided in the second cooling zone N (but are not shown in FIG. 1).

The fired bulk material 1 is conveyed on the stepped grate surface 2 and is cooled in the first cooling zone W which serves for heat recovery and the second cooling zone N which serves for after-cooling by means of an air stream (arrow 9) which passes through the grate surface 2 and the material bed 1.

Investigations have shown that a constant height of the material bed over the grate surface usually results in a falling pressure profile for the air stream passing through the material bed. However, if the height of the material bed 1 is raised in the transport direction at least in the first cooling zone, this compensates for the falling pressure profile and a rising pressure profile can even be achieved. As a result the degree of heat recuperation is decisively improved.

In the embodiment of FIG. 1 the layer height of the material bed 1 in the first cooling zone W is set exclusively by the conveying characteristic of the stepped grate surface 2 and by gravity. The conveying characteristic are a function of the construction of individual grate elements 2a of the grate surface 2 and the conveying speed of the grate surface. The layer height of the material bed 1 of the first and second cooling zones can be set differentially by adjusting of the separate drives 4 and 5.

One embodiment of the invention shown in FIG. 1 includes the individual steps 3 of the grate surface 2 in the first cooling zone W having separate drives 8 for each individual step 3 shown by broken lines. With the individual setting of the conveying speed in the individual steps, the height of the material bed can be adapted to the properties of the particular bulk material which is to be cooled. Individual settings of the conveying speed of each step 3 makes it possible for the bulk material to be conveyed relatively quickly with a relatively low material bed height in the initial region of the first cooling zone W, which serves for heat recovery. With low material bed height in the initial region of the first cooling zone W, the material is effectively quenched and caking together is prevented, As bulk material progresses through the first cooling zone W the height of the material bed rises, so that a sufficiently long heat exchange time between bulk material and cooling gas is available for good heat recovery.

In this connection, the embodiment according to FIG. 1 offers a further possibility in that the air stream (arrow 9) passes through the grate surface 2 and the bulk material 1 at different speeds in at least individual regions or steps of both cooling zones.

In order to alter the conveying characteristic of individual steps 3 the possibility exists, apart from differential setting of the drives 8, of constructing the grate elements 2a of individual steps 3 of the grate surface 2 of the first cooling zone W differently.

In the embodiment shown in FIG. 2 the grate elements 2'a of the step 3'a project more steeply into the bulk material 1 than the grate elements 2'b of the step 3'b. With the same speed of the grate elements in both steps 3'a and 3'b the bulk material is conveyed more quickly over the first step 3'a, since the higher layers of the bulk material 1 are carried along better over the step 3'a because of the deeper engagement of the grate elements 2'a in the bulk material 1.

Differing construction of individual steps can replace the separate drives 8 of FIG. 1, so that only one drive is necessary for the first cooling zone W or even for both cooling zones. However, it is also possible within the scope of the invention to provide separate drives for individual steps in spite of the different construction of individual steps.

A further embodiment is shown in FIG. 3 in which individual grate elements 2"a, 2"b are constructed differently within one step 3". The employment of different grate elements within one step makes it possible for one part of the grate surface belonging to one specific step to be constructed to provide the conveying speed required by its position within the cooling zone. Another part of the grate surface belonging to the same specific step an be constructed to accommodate specific bulk material characteristics such as angle of repose and particle size.

Figure 4:
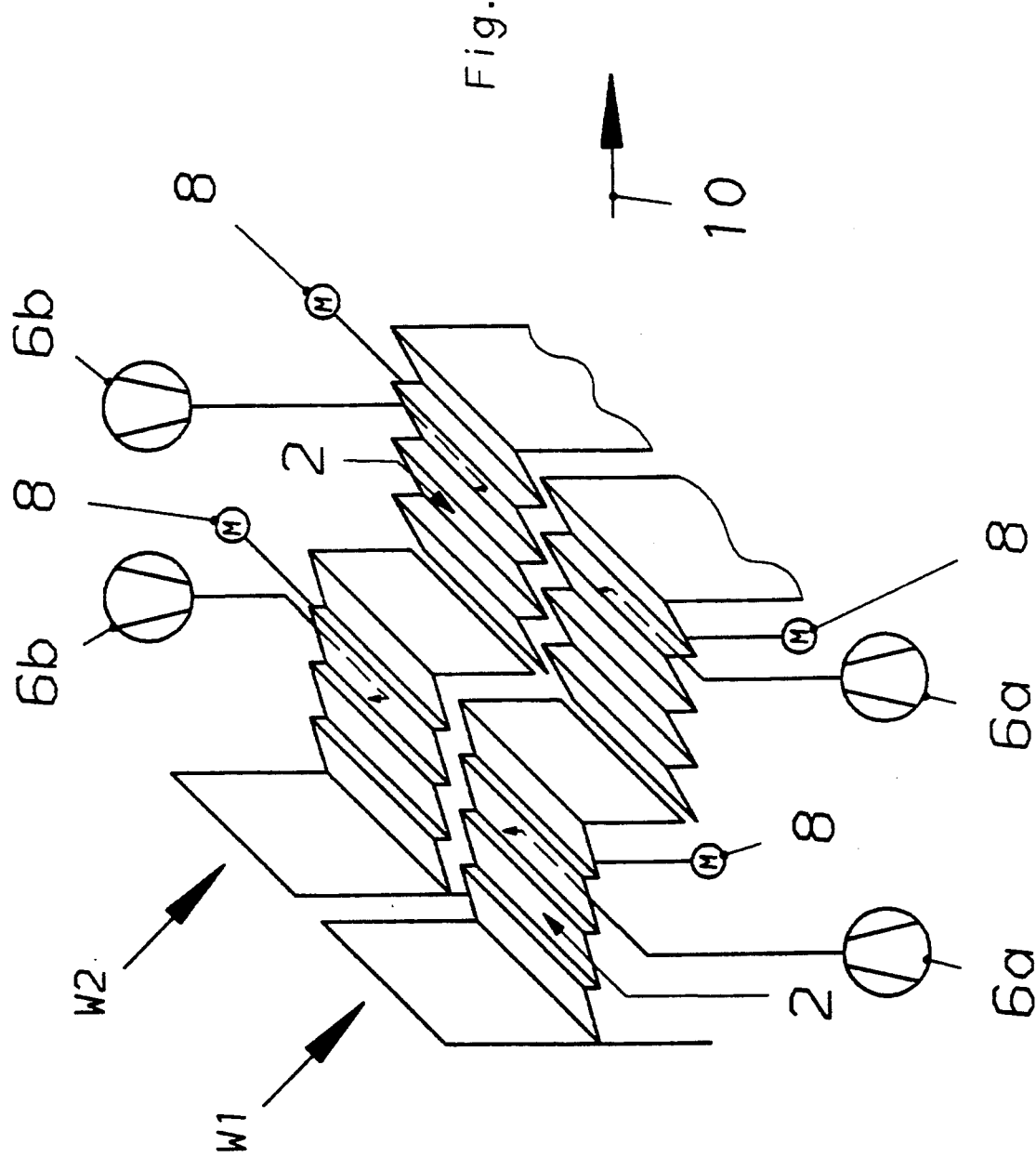

A further embodiment of the invention is sown in a spatial representation in FIG. 4. In this case the first cooling zone W is at least partially divided lengthwise in the transport direction indicated by arrow 10, so that the first cooling zone W is divided into two parts W1 and W2.

The individual parts W1 and W2 can have separate drives. In this case either one drive is provided for the entire part of a separate drive 8 is provided for each step of the part. Aerating chambers 6a or 6b respectively, which can be supplied separately, are associated with the individual parts W1 and W2. In the embodiment according to FIG. 4 each individual step of a part has an aerating chamber. However, it is also conceivable to have one aerating chamber supplying air to several steps within one part.

In the embodiment according to FIG. 1 the surface 1a of the material bed extends in approximately level form over both cooling zones.

Figure 5:
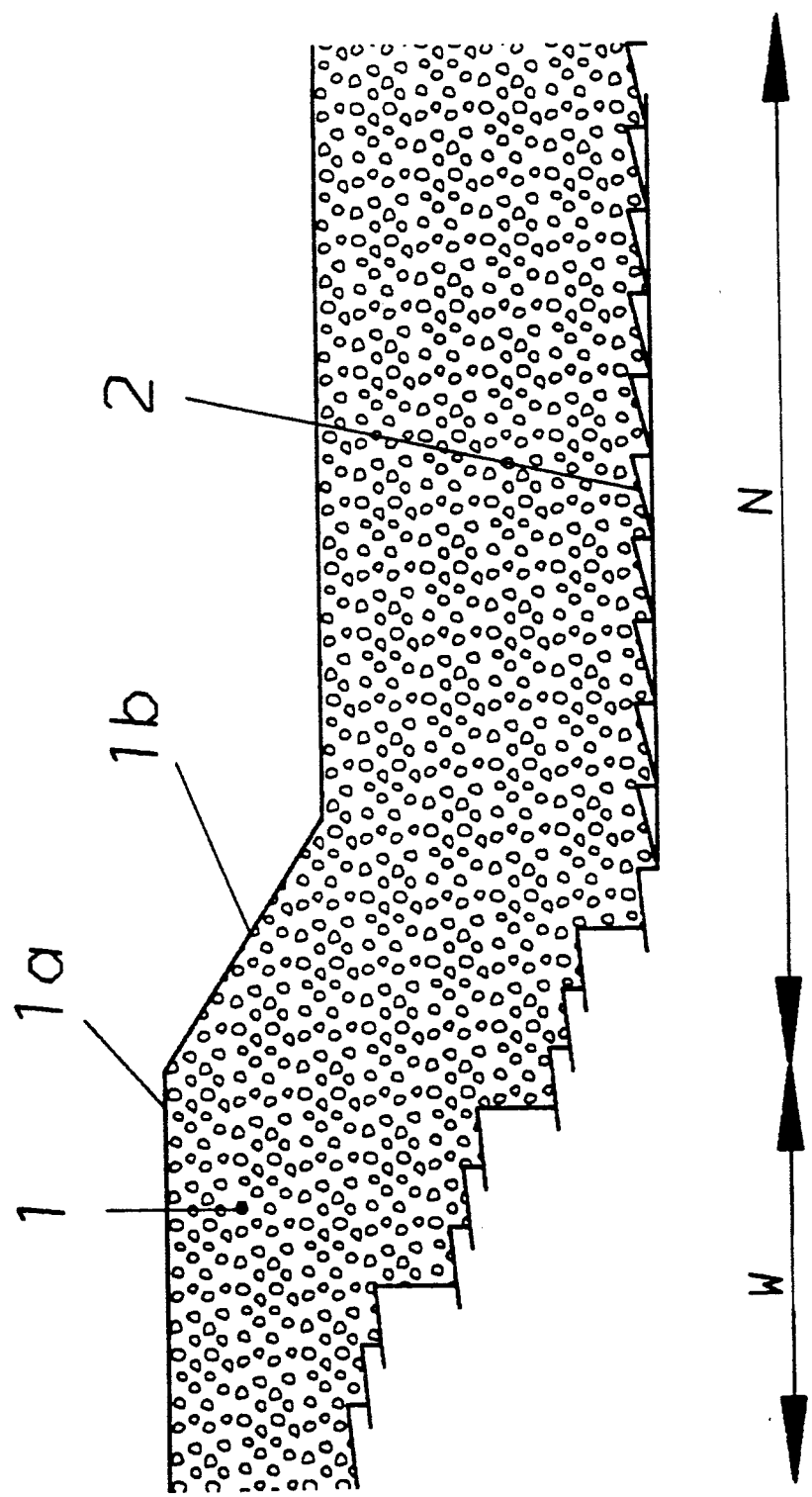
FIGS. 5 to 7 are schematic representations of various material bed distributions in the first and second cooling zones.

The surface 1"a of the embodiment according to FIG. 5 extends in approximately level form over the first cooling zone W and passes with a step 1"b into the second cooling zone N. Such shaping of the surface 1"a by contrast with the embodiment according to FIG. 1 can be produced for example by a different conveying characteristic in the transition region between both cooling zones, and particularly by a higher conveying sped in the second cooling zone N.

Figure 6:
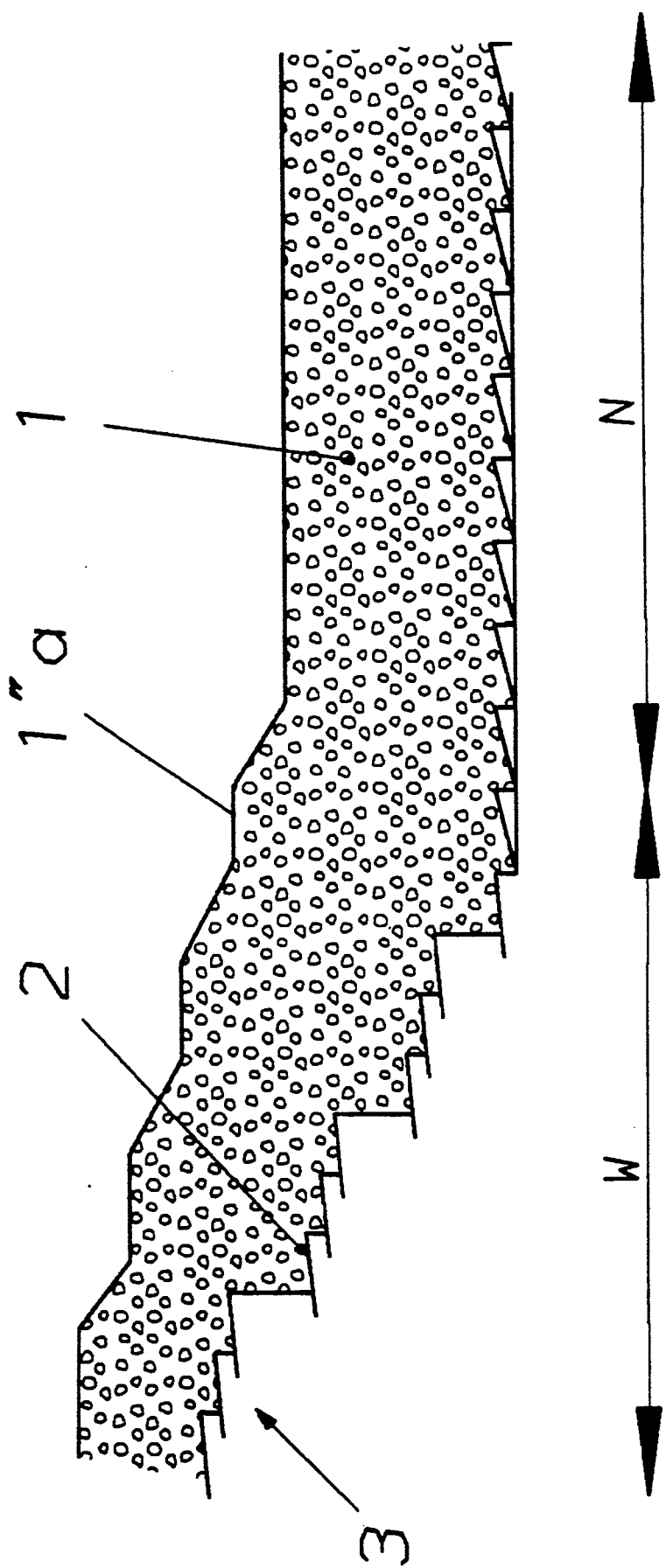

In the embodiment according to FIG. 6 the surface 1"a of the material bed in the first cooling zone W is stepped approximately corresponding to the stepping of the grate surface 2 of the first cooling zone W. In this case the stepping can be produced on the one hand by the conveying characteristic of individual steps 3 and on the other hand by the different height of adjacent steps.

Figure 7:
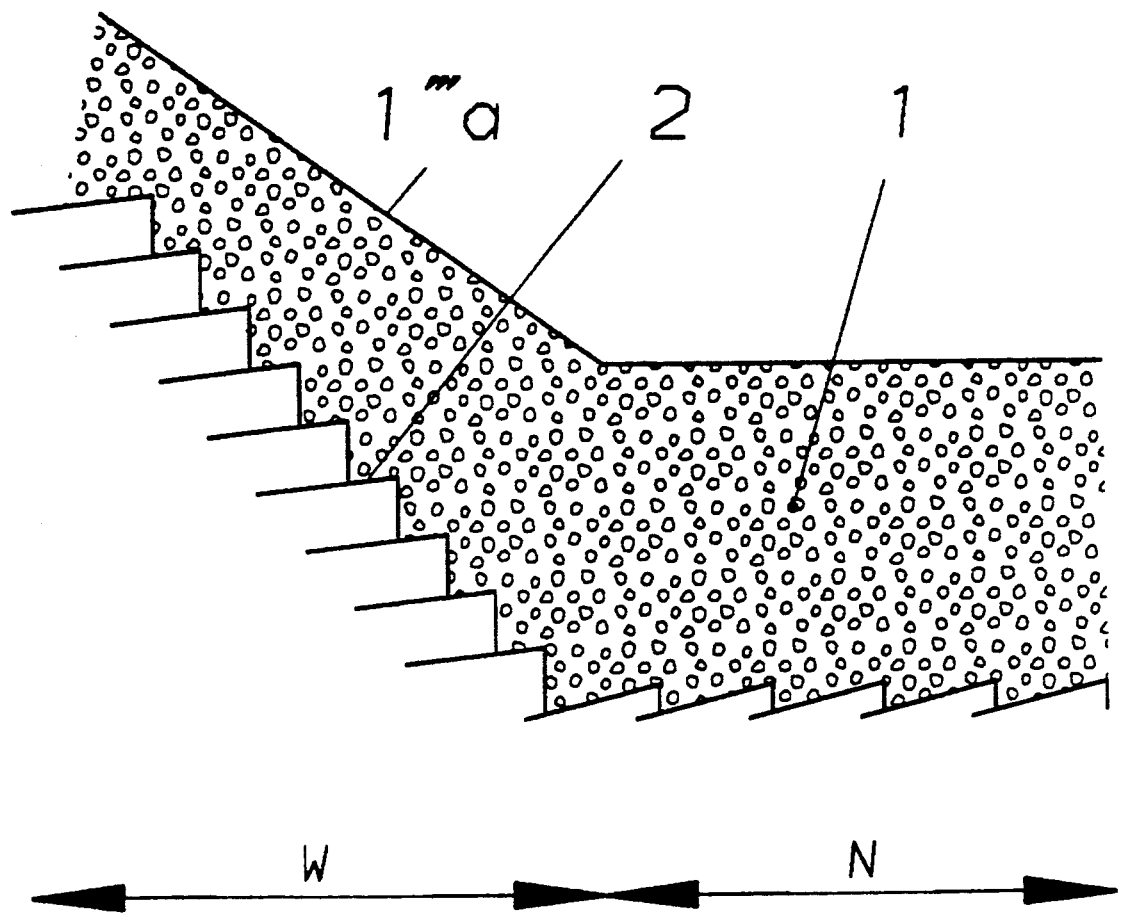

In the embodiment according to FIG. 7 the approximately level surface 1'''a of the material bed 1 is more steeply inclined in the first cooling zone W than in the second cooling zone N.

It is also possible within the scope of the invention to allow the stepping in the first cooling zone W to become increasingly small, so that in the limiting case an inclined plane is produced. Also in the limiting case the angle of inclination of this plane could then go towards zero.

We claim:

1. A method of cooling fired bulk material on a grate conveyor having a movable first section and a movable second section downstream of said first section in a position to receive such material therefrom, said method comprising delivering said material to said first section; moving said first section in a direction and at a rate to cause the material thereon to be delivered to said second section; blowing cooling air upwardly through the material on said sections; and moving said second section in a direction and at a rate to cause the material thereon to move away from said first section but slower than the rate of movement of said first section so that the depth of the material on said second section is greater than that of the material on said first section.

2. The method according to claim 1 including blowing the cooling air through the material on said conveyor at different speeds.

3. The method according to claim 1 including maintaining the upper surface of the material on said conveyor substantially uniform.

4. The method according to claim 1 including establishing different levels of the upper surface of the material on said conveyor.

5. The method according to claim 1 including establishing a series of steps in the upper surface of the material on said conveyor.

6. Apparatus for cooling fired bulk material comprising grate conveyor means having a movable first section and a movable second section in communication with and downstream of said first section; means for delivering bulk material to said first section; drive means for moving said first section at a selected rate of speed in a direction to convey material thereon to said second section; drive means for moving said second section at a rate of speed lower than that of said first section and in a direction to move material on said second section away from said first section; and means for blowing cooling air through each of said sections and the material thereon, the difference in the rates of movement of said sections causing he material on said second section to have a greater depth than that of the material on said first section.

7. Apparatus according to claim 6 wherein each of said conveyor sections has a stepped upper surface.

8. Apparatus according to claim 6 including means forming an aerating chamber below each of said conveyor sections.

9. Apparatus according to claim 6 wherein each of said conveyor sections has a different surface configuration.

10. Apparatus according to claim 6 wherein said first conveyor section has its upper surface at one level and said second conveyor section has its surface at a level lower than that of said first conveyor section.

11. Apparatus according to claim 6 wherein said conveyor sections are at such levels and the rates of speed of said conveyor sections are such that the surface of the material on said conveyor sections is at the same level.

12. Apparatus according to claim 6 wherein said conveyor sections are at such levels and the rates of speed of said conveyor sections are such that the surface of the material on said second conveyor section is at a level lower than that of the surface of the material on said first conveyor section.

* * * * *

UNITED STATES PATENT AND TRADEMARK OFFICE
CERTIFICATE OF CORRECTION

PATENT NO. : 5,129,820

DATED : July 14, 1992

INVENTOR(S) : Detlev Kupper and Klaus Adler

It is certified that error appears in the above-identified patent and that said Letters Patent is hereby corrected as shown below:

Column 1, line 13, change "built" to -- bulk --; line 33, after "off" insert -- in the transport direction is not favorable for the recovery of heat from the granular mass. The recovery of heat is referred to as recuperation. A method and apparatus for recovery of heat are disclosed in U.S. patent No. 4,457,081 to von Wedel in which the height of --; line 35, change "recover" to -- recovery --; line 39, insert a comma after "zone"; line 55, after "time" insert -- . Replacement --.

Column 2, line 15, change "essentially" to -- essential --.

UNITED STATES PATENT AND TRADEMARK OFFICE
CERTIFICATE OF CORRECTION

PATENT NO. : 5,129,820

DATED : July 14, 1992

INVENTOR(S) : Detlev Kupper and Klaus Adler

It is certified that error appears in the above-identified patent and that said Letters Patent is hereby corrected as shown below:

Column 3, line 25, after "prevented" change the comma to a period; line 54, change "different" to -- differing --; line 64, change "an" to -- can --; line 67, change "sown" to -- shown --.

Column 4, line 26, change "sped" to speed --.

Column 5, line 17, change "he" to -- the --.

Signed and Sealed this

Twenty-fourth Day of August, 1993

Attest:

BRUCE LEHMAN

Attesting Officer

Commissioner of Patents and Trademarks